(12) United States Patent
Weaver

(10) Patent No.: US 6,526,066 B1
(45) Date of Patent: Feb. 25, 2003

(54) APPARATUS FOR CLASSIFYING A PACKET WITHIN A DATA STREAM IN A COMPUTER NETWORK

(75) Inventor: Jeffrey Charles Weaver, London (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/118,339

(22) Filed: Jul. 16, 1998

(51) Int. Cl.[7] .............................. H04J 3/16; H04J 3/22
(52) U.S. Cl. ...................... 370/465; 370/429; 370/469; 370/912; 709/224; 709/230
(58) Field of Search ................................ 370/230, 351, 370/429, 465, 469, 912; 709/224, 230, 238

(56) References Cited

U.S. PATENT DOCUMENTS

| | | | |
|---|---|---|---|
| 5,243,596 A | * | 9/1993 | Port et al. .................. 370/94.1 |
| 5,406,322 A | * | 4/1995 | Port et al. ..................... 348/15 |
| 5,509,006 A | * | 4/1996 | Wilford et al. ............... 370/60 |
| 5,721,920 A | * | 2/1998 | Mak et al. ................... 395/672 |
| 5,862,335 A | * | 1/1999 | Welch, Jr. et al. ...... 395/200.54 |
| 5,890,217 A | * | 3/1999 | Kabemoto et al. .......... 711/141 |
| 6,104,696 A | * | 8/2000 | Kadambi et al. ........... 370/218 |
| 6,154,446 A | * | 11/2000 | Kadambi et al. ........... 370/239 |
| 6,157,955 A | * | 12/2000 | Narad et al. ................ 709/228 |
| 6,167,047 A | * | 12/2000 | Welfeld ....................... 370/389 |
| 6,240,452 B1 | * | 5/2001 | Welch, Jr. et al. .......... 709/224 |

* cited by examiner

Primary Examiner—Hassan Kizou
Assistant Examiner—Joe Logsdon
(74) Attorney, Agent, or Firm—Blakely Sokoloff Taylor & Zafman LLP

(57) ABSTRACT

An apparatus for classifying a packet within a data stream in a network includes a state machine into which certain functionality has been hardwired. Specifically, the state machine defines in hardware a predetermined number of states and a predetermined number of transitions between these states. The state machine outputs a state value which is indicative of the classification of a package. A programmable memory is coupled to the state machine, and stores transition parameters for each transition of the set of transitions, thus allowing the hardwired states and transitions to be programmable.

23 Claims, 11 Drawing Sheets

APPARATUS FOR CLASSIFYING A PACKET WITHIN A DATA STREAM IN A COMPUTER NETWORK

FIELD OF THE INVENTION

The present invention relates generally to the field of network computing and, more specifically, to the classification of packets within a data stream in a computer network.

BACKGROUND OF THE INVENTION

Traffic filters are widely utilized within network devices, such as routers, routing switches, switches and bridges, to selectively handle network traffic, which may be in the form of packets, frames, cells or data grams. Traffic filters are typically employed to block, forward, log or prioritize certain network traffic as it traverses a network device. In order to perform these functions, traffic filters examine the contents of information fields included within packet headers.

Traffic filters may be broadly categorized as being either inbound traffic filters, which act on packets coming into a network device, or outbound traffic filters, which act on packets the network device is forwarding. Inbound traffic filters are employed primarily for security reasons, and block certain traffic from reaching destination nodes within a network. Outbound traffic filters are primarily used to ensure timely delivery of critical data. It is furthermore possible to implement more than one traffic filter within a single device with a view to ensuring consistent service, reducing network congestion by minimizing the flow of unnecessary traffic, prioritizing important traffic and enhancing security. It will readily be appreciated that the identification and classification of packets within a data stream received at network device is fundamental to the performance of the above traffic filtering operations.

As transmission rates over network links (and the operating speeds of switching and routing circuitry within network devices) increase, the timely classification of packets by traffic filters is becoming increasingly challenging.

SUMMARY OF THE INVENTION

An apparatus for classifying a packet within a data stream within a network includes a hardwire state machine defining a predetermined set of states and a predetermined set of transitions between these states. The state machine is further configured to output a value indicative of the classification of the packet. The apparatus further includes a programmable memory, coupled to the state machine, to store transition parameters for each of the transitions between the states so as to allow transition conditions to be programmable.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for parsing and classifying a packet within a data stream in a network are described. In the following description, for purposes of explanation, numerous specific details are set forth in order to provide a thorough understanding of the present invention. It will be evident, however, to one skilled in the art that the present invention may be practiced without these specific details.

Figure 1:
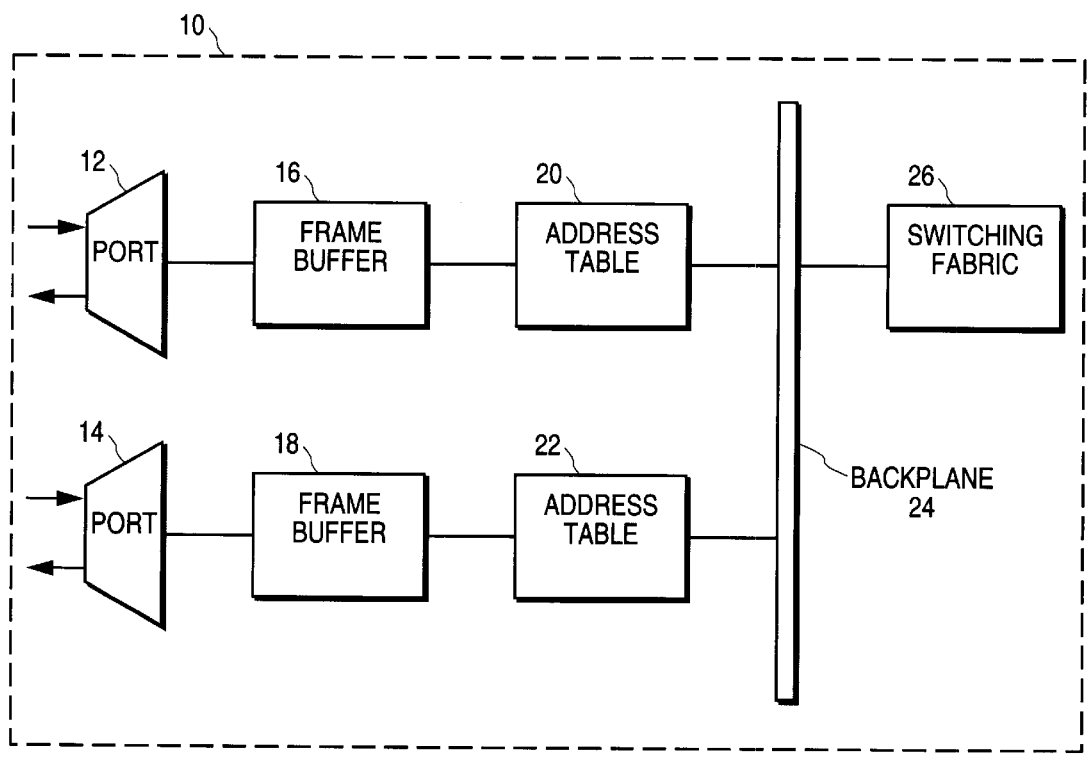
FIG. 1 is a block diagram illustrating functional units included within an exemplary switch.

FIG. 1 is a high level schematic representation of a switch 10 within the present invention may be employed. Of the multiple ports included in the switch 10, only ports 12 and 14 are illustrated, and each couples the switch to a respective network link (or line). The ports 12 and 14 are respectively coupled to frame buffers 16 and 18, which store frames that are transmitted and received by the ports, for analysis and latency. The frame buffers 16 and 18 are respectively coupled to address tables 20 and 22. The address tables 20 and 22 specify on which port a destination station can be found. A switching fabric 26 delivers packets or frames from one port to another via a backplane 24 and according to a particular forwarding mechanism, such a store-and-forward, a cut-through or a modified cut-through mechanism.

In order to switch or route a packet according to its specific mechanism, the switching fabric 26 may require the classification of a packet so that routing operations may be performed in a shorter time. In many switches, the transit time between ingress and egress of a packet is in the region of 20 $\mu$s. One approach is to attempt the classification of a packet within the switching fabric itself. However, this may introduce an unacceptable latency.

Figure 2:
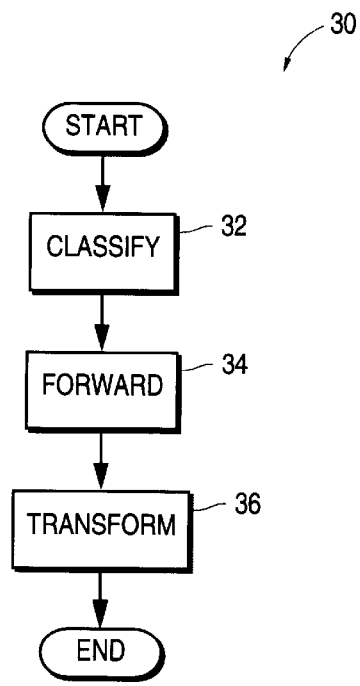
FIG. 2 is a flow chart illustrating three pipestages to which a packet is subject when traversing a switch.

FIG. 2 is a flow chart illustrating the three pipestages (or steps) 30 implemented by a Layer-III switching fabric. At a classification pipestage 32, the type of packet is identified and key routing information is extracted therefrom. At the forwarding pipestage 34, the packet is forwarded to either an output or to an adjunct processor for further processing, based on information gained during the classification pipestage 32. At the transformation pipestage 36, the packet is modified upon egress to accommodate the sub-network technology upon which it is being transmitted. The present invention is implemented in the classification pipestage 32 to classify a packet in an efficient and expeditious manner.

Figure 3:
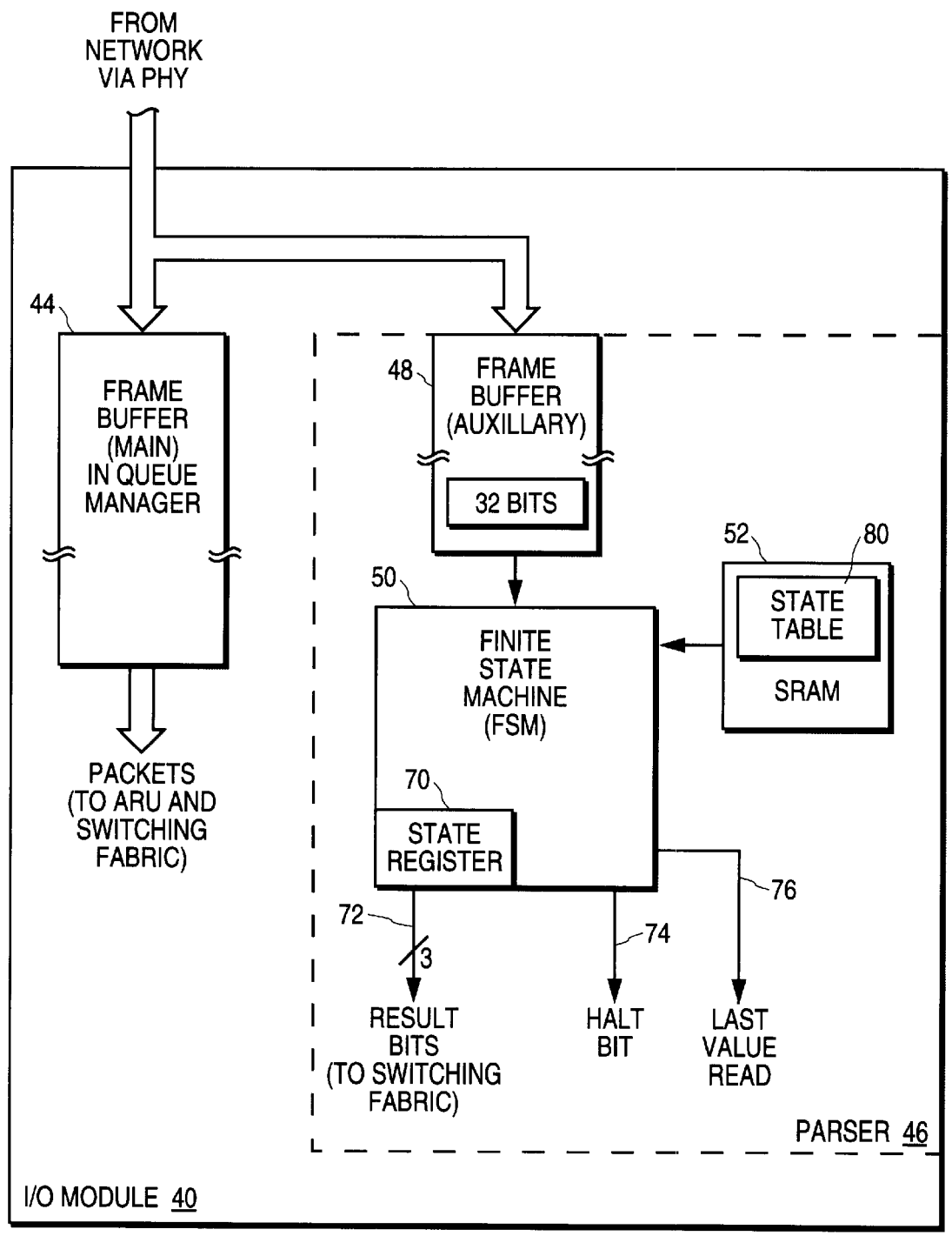
FIG. 3 is a block diagram showing the architectural details of an exemplary I/O module within the present invention may be implemented.

FIG. 3 is a block diagram illustrating an Input/Output (I/O) module 40 according to one exemplary embodiment of the present invention, which may be incorporated within a network device, such as a switch. The I/O module 40 includes a main frame buffer 44, which may be located within a queue manager, and a parser 46. Both the main frame buffer 44 and the parser 46 are coupled to receive a data stream, composed of a succession of packets, from a network link via a port and physical layer device (PHY) (not shown). The data stream is fed simultaneously to the main frame buffer 44 and the parser 46, so as to enable the parser 46 to commence with the identification and classification of a packet simultaneously with the reception thereof into the main frame buffer 44. From the main frame buffer 44, the data stream is forwarded to an Address Resolution Unit (ARU) (not shown) which maintains an address table and then to a switching fabric (not shown).

The parser 46 includes an auxiliary frame buffer 48, a hardwire Finite State Machine (FSM) 50 and a programmable memory in the form of a Static Random Access Memory (SRAM) 52. In one embodiment of the invention, the auxiliary frame buffer 48 is sized to receive an entire packet, and comprises a 16×32 bit, first-in first-out (FIFO) buffer, from which the data stream is presented to the FSM 50 in 32-bit increments. It is important to note that the FSM 50 is able to access and inspect the entire contents of the auxiliary buffer 48. This is particularly advantageous, in that the FSM 50 is thus able to inspect a complete packet for the purposes of classification. Utilizing the auxiliary frame buffer 48, the FSM 50 is able to "freeze" the data stream as required so as to facilitate the examination of multiple portions of a packet. While a header, which usually comprises the first portion of the packet, includes the majority of the information that is typically required for classification, field information that is located deeper within the packet may be required for classification based on unusual criteria. By accumulating the entire contents of a relevant packet within the auxiliary frame buffer 48, and by providing the FSM 50 with access to the entire packet as stored in the auxiliary frame buffer 48, the present invention facilitates greater flexibility and possibilities in classification operations.

Figure 4:
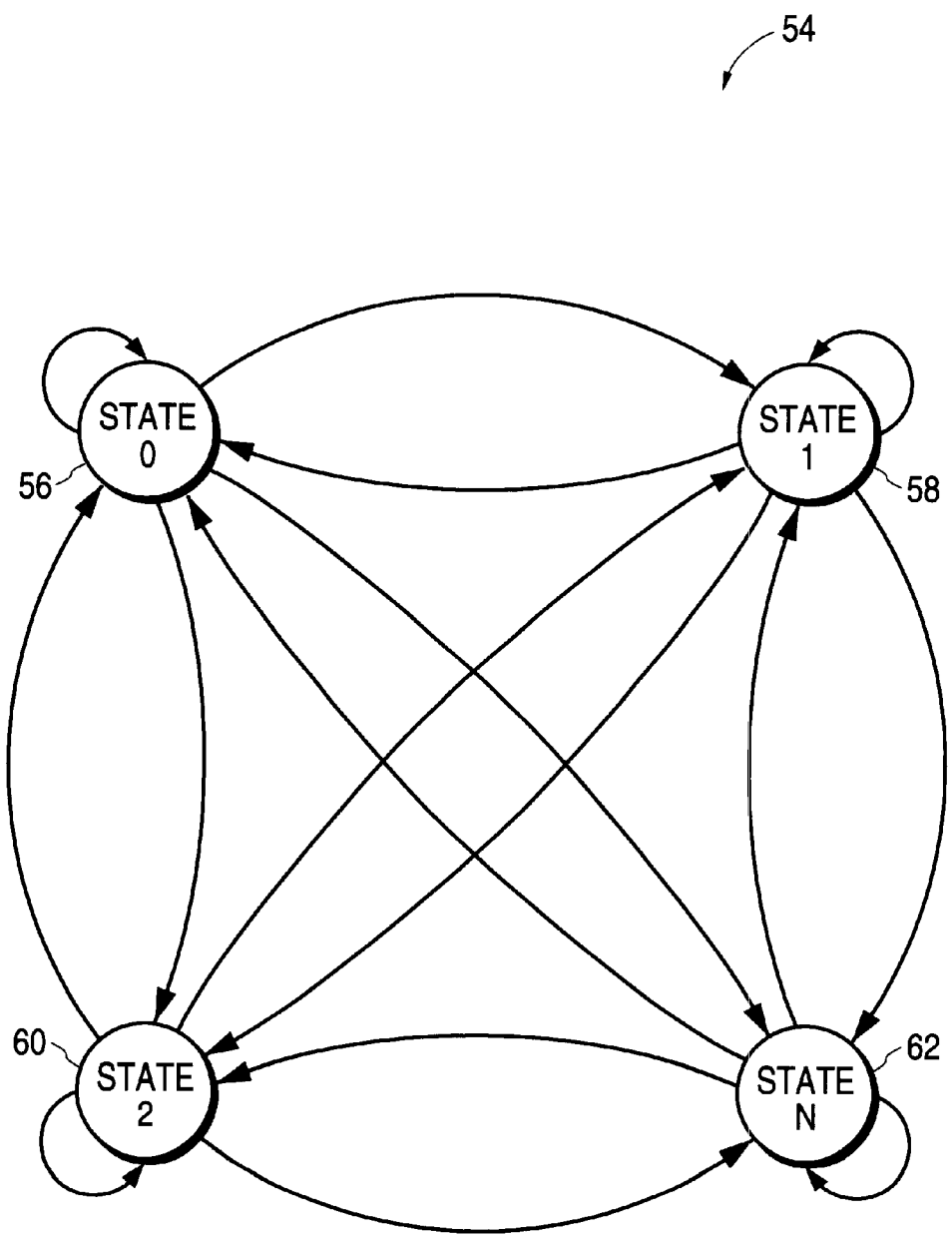
FIG. 4 is a state diagram showing an exemplary set of states, and an associated set of transitions between the states, which may be defined by a Finite State Machine (FSM), according to one embodiment of the present invention.

The FSM 50 is hardwired to operate within one of a fixed number of states, and to have a predetermined set of transitions for transitioning between these states. In one exemplary embodiment of the invention, the FSM 50 may implement eight states, and a set of transitions for enabling a transition from any one of the eight states to any one of the other states. Exemplary states 56, 58, 60 and 62 are illustrated in the state diagram 54 of FIG. 4. Each of the states 56, 58, 60 and 62 is hardwired within the FSM 50, as are the set of transitions, indicated with appropriate arrows, between these states. While the states and transitions for passing between the states are hardwired within the FSM 50, the conditions under which these states exist, and the conditions for triggering a transition from one state to another, are not hardwired within the state machine, and are programmable as will be described below.

Returning to FIG. 3, it will be noted that the FSM 50 includes a state register 70, which stores a value indicative of the current state occupied by the FSM 50.

The FSM 50 is furthermore shown to provide three outputs, namely a three-bit RESULT output 72, a HALT output 74 and a LAST VALUE READ output 76. In one embodiment of the invention the RESULT output 72 is merely the contents of the state register 70, and accordingly reflects the current state of the FSM 50. The RESULT output 72 indicates the result of a classification operation performed by the FSM 50, and is forwarded to the switching fabric to be utilized as required within a switching routing protocol. The HALT output 74 is asserted to indicate a valid RESULT output 72, this signal being driven low to indicate a valid result. The LAST VALUE READ output 76 comprises a set of bits within the data stream which the FSM 50 compared to a specified value (a comparison value) to trigger the transition into the state indicated by the RESULT output 72.

In order to allow proper functioning, the data input rate via the network link and the clock speed of the FSM 50 are synchronized. Specifically, the clock speed of the FSM 50 is such as to allow a "word" processing rate of N words/second, each word comprising 32 bits, in order to comply with a 20 μ ingress/egress period. The word processing rate may be expressed as follows:

$$P_{rate} = I_{rate}/V_{size}$$

where:

$I_{rate}$=data stream input rate (bits/second).
$V_{size}$=input word size, as determined by the buffer 48.
$P_{rate}$="word" processing rate.

As discussed above, a set of states, and a set of potential transitions between these states, are hardwired within the FSM 50. However, the definition of each of the states, and the definition of the transition conditions under which a transition from one state to another occurs, are programmable. To this end, the FSM 50 is coupled to read a state table 80, stored in the SRAM 52. In one embodiment of the invention lookup, fetch and execute operations performed by the FSM 50 with respect to rows of the state table 80 may be pipelined in that an execute operation may be performed simultaneously with a fetch operation to a subsequent row. Fetch and execute circuitry may accordingly "ping-pong" between row operations in view of the stateless nature of this circuitry. The state table 80 contains values for programming the FSM 50 so that the state transitions occur in response to the identification of predetermined bit sequences in the data stream, as will be more fully described below. By storing only a state table within the SRAM 52, and including the actual program functionality in hardware within the FSM 50, the present invention, in one embodiment, allows a 32-bit word of the data stream to be examined by the FSM 50 in one clock cycle, and allows the parser 46 to remain programmable. Further, by maintaining only transition parameters within the SRAM 52, the size of the SRAM can be kept small.

Figure 5:
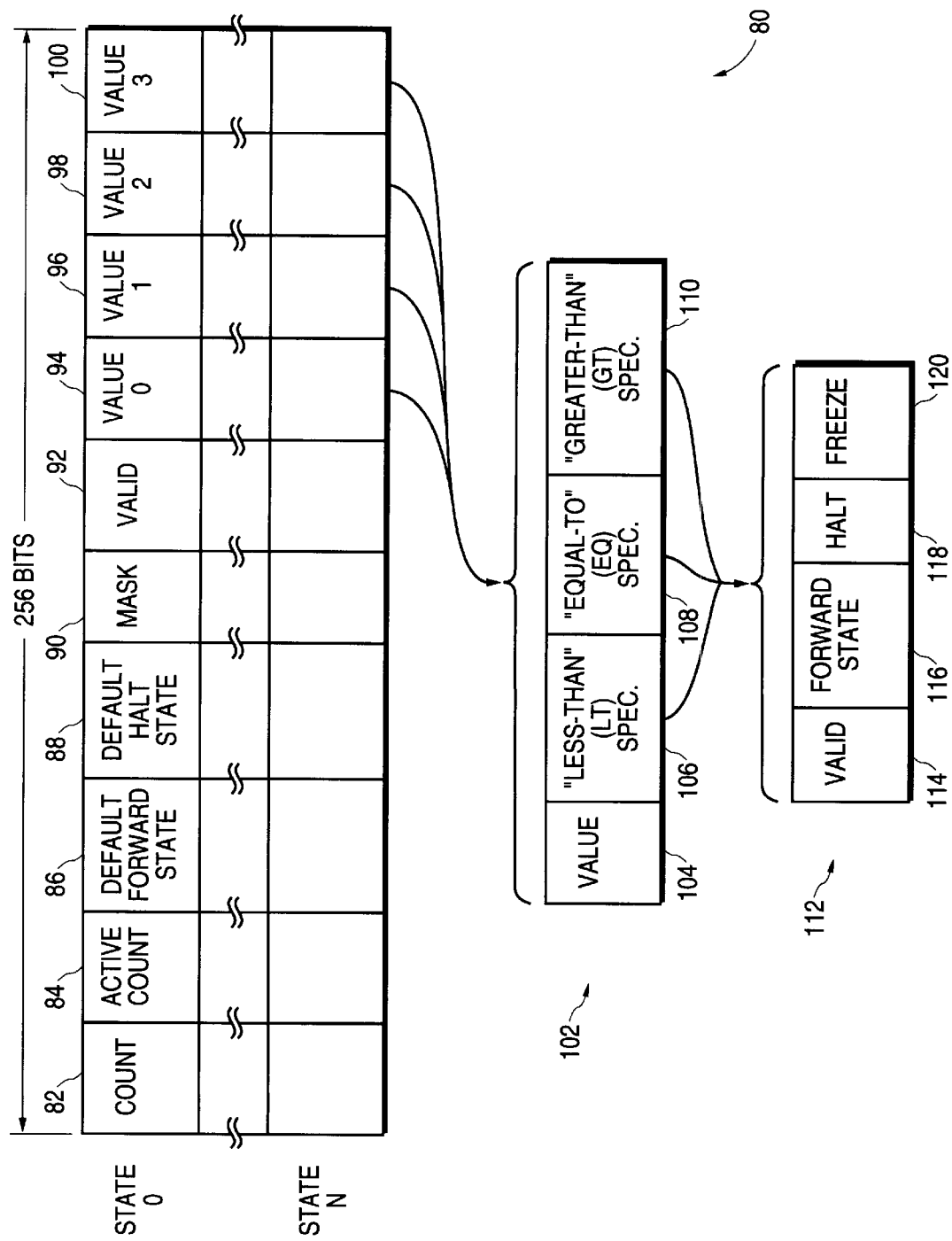
FIG. 5 is a state table, according to one embodiment of the present invention, that may be stored within a memory resource accessed by the Finite State Machine.

FIG. 5 is a block diagram illustrating an exemplary structure for a state table 80. The state table 80 is shown to include a row for each state within the FSM 50, each row comprising a predetermined set of fields.

The size of each row is 256 bits, and a 8-state table is sufficient to enable simple Internet Protocol (IP) classification.

Each row within the state table 80 is further shown to include at least ten primary fields as discussed below. A COUNT field 82 stores a value indicative of the maximum number of times that a state can transition to itself before entering a default forward state. An ACTIVE COUNT field 84 stores a value indicative of the actual number of consecutive transitions that have been made from the respective state back to itself. In one embodiment, an ACTIVE COUNT value is set to a default value of 255 when entering a state, and then decremented by 1 each time the state returns to itself. In this example, the value with which the contents of the ACTIVE COUNT 84 field is initialized is the value stored in the COUNT field 82.

A DEFAULT FORWARD STATE field 86 stores a value indicative of a state to which the FSM 50 is forwarded in the event that the ACTIVE COUNT value decrements to zero. A DEFAULT HALT STATE field 88 contains an indication of whether the FSM 50 halts or not in the default forward state. In one embodiment of the invention, the DEFAULT HALT STATE field 88 may simply store a 1 or a 0, a 0 indicating a halt condition in the default forward state.

A MASK field 90 includes a N-bit mask for masking irrelevant portions of the data stream during a comparison operation, as will be described in further detail below. The VALID field 92 is a 4-bit value indicating which of VALUE fields 94, 96, 98 and 100 is valid. For a value of 0001 in the VALID field 92 indicates that only the value stored in VALUE field 100 is valid.

The VALUE fields 94, 96, 98 and 100 each comprise four sub-fields, as indicated at 102, namely a VALUE sub-field 104, a LESS-THAN specification sub-field 106, and EQUAL-TO specification sub-field 108 and a GREATER-THAN specification sub-field 110. The VALUE sub-field 104 includes a comparison value that is compared to a predetermined portion of the data stream masked by the value stored in the MASK field 90. The specification sub-fields 106, 108 and 110 each detail state transitions to be performed, and output conditions once those transitions have been performed, for less than, equal to and greater than operations performed by the FSM 50 utilizing the contents of the VALUE field 104 and the masked portion of the data stream. More specifically, as indicated at 112, each of the specification sub-fields 106, 108 and 110 includes four further sub-fields namely a VALID sub-field 114, a FORWARD STATE sub-field 116, a HALT sub-field 118 and a FREEZE sub-field 120. The VALID sub-field 114 indicates whether the relevant specification 106, 108 or 110 is in fact valid. In one embodiment of the present invention, the VALID sub-field 114 may contain a simple 1 or a 0 to indicate a valid or invalid state for the associated specification. Should the associated specification be indicated as being invalid, the comparison operation defined by the specification 106, 108 or 110 is not performed, or the results thereof are ignored. The FORWARD STATE sub-field 116 specifies the to which the FSM 50 transitions in the event that the comparison operation (i.e., a "less-than", "equal to" or "greater than" comparison) is true. For example, should the value stored in the VALUE sub-field prove to be less than an examined and masked portion of the data stream, the FSM 50 will transition to the contents of the FORWARD STATE sub-field 116 contained in the LESS-THAN specification sub-field 106.

A HALT sub-field 118 includes an indication as to whether the FSM 50 should halt once in the specified forward state, thus indicating the conclusion of a classification operation. As described above in reference to FIG. 3, when halted the FSM 50 asserts the HALT output 74 to indicate the RESULT output 72 as being valid.

The FREEZE sub-field 120 includes an indication of whether the FSM 50 should freeze the data stream once it has transitioned to the forward state. By freezing the data stream, the FSM 50 is able to perform two or more decisions with respect to the portion of the data stream (e.g., 32-bit input word) under examination. For example, in an Ethernet packet the "LENGTH/TYPE" field may determine whether the "ETHERTYPE" field is either RSAP/SSAP or ethertype. However, as both the LENGTH/TYPE and ETHERTYPE fields occur within the same 32-bit word, it is useful to freeze the data stream so that two comparison operations may be performed on the 32-bit stored in the buffer 48.

A program comprising exemplary lines of code is provided below. The program establishes an exemplary state table 80 within the SRAM 52. Essentially two commands are used to establish the table, namely a "set_default" command and a "set_transition" command. The "set_default" command specifies four values, namely a state value (identifying a row and accordingly a state within the state table 80), a count value, a default forward state value and a halt value. The "set_transition" command is proceeded by twelve values, namely a state value, a row value, a mask value, a comparison value and then three sets of values to be included within the "less-than", "equal-to" and "greater-than" specifications. Specifically, each set includes a valid value, a forward state value, a halt value and a freeze value.

```
program_ipl (class state_machine* sm)      0.
set_default (0, 3, 1, 0);                  1.
set_default (1, 17, 7, 1);                 2.
set_transition (1, 0,
0xffff0000, 0x06000000,
1, 2, 0, 1,
0, 0, 0, 0,
0, 0, 0, 0);                               3.
set_transition (1, 1,
0xffff000, 0xaaaa0000,
1, 6, 1, 0,
1, 3, 0, 0,
1, 6, 1, 0);
set_default (2, 16, 7, 1);                 5.
set_transition (2, 0,
0x0000ffff, 0xa0a0,
1, 6, 1, 0,
1, 3, 0, 0,
1, 6, 1, 0);                               6.
set_default (3, 15, 7, 1);                 7.
set_transition (3, 0,
0xf0000000, 0x40000000,
1, 6, 1, 0,
1, 5, 1, 0,
1, 6, 1, 0);                               8.
```

Figure 6:
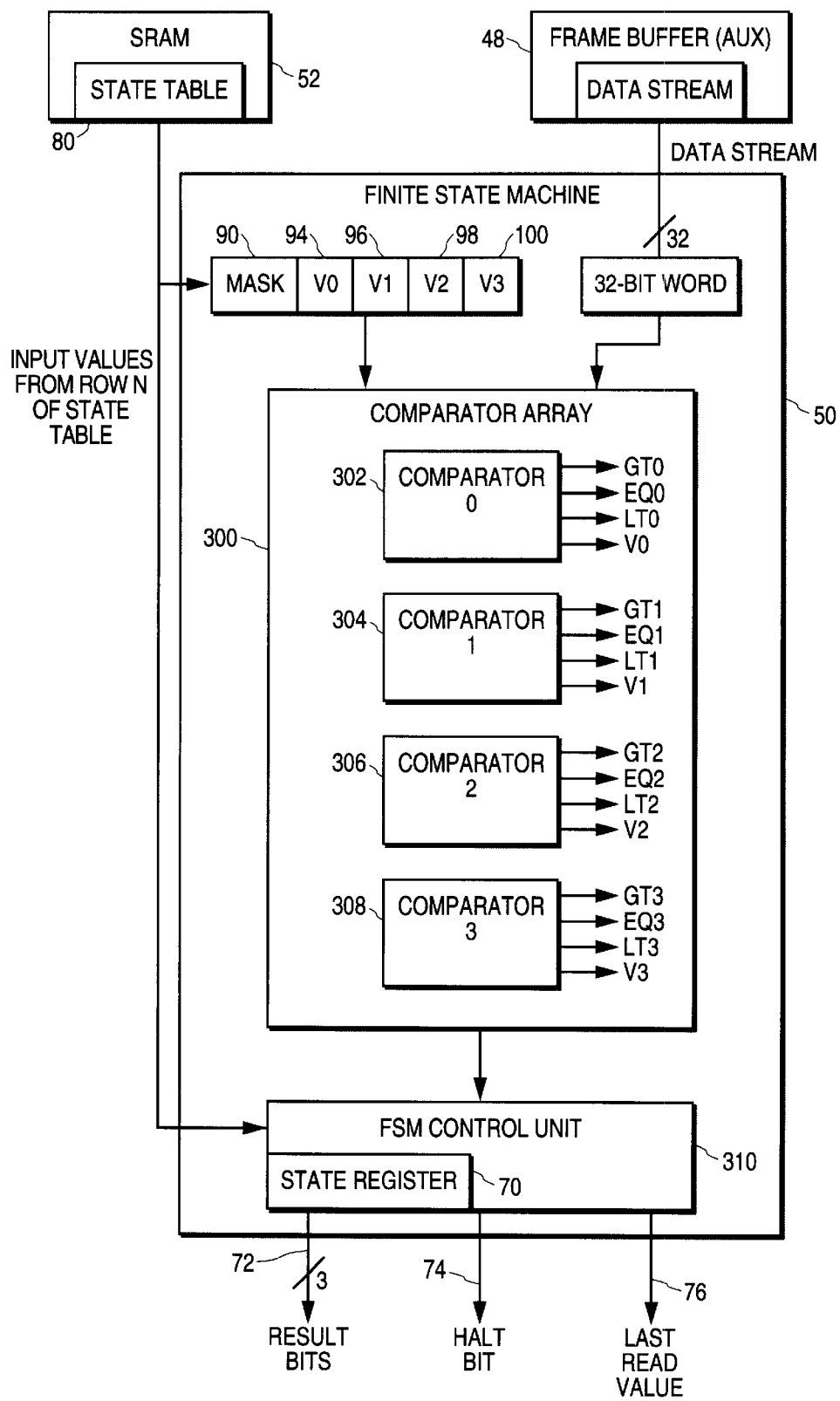
FIG. 6 is a block diagram illustrating further details regarding the FSM, according to one embodiment of the present invention, shown in FIG. 3.

FIG. 6 is a block diagram illustrating further structural details of an exemplary embodiment of the FSM 50. The FSM 50 is shown to be coupled to receive values stored in the VALUE fields 94, 96, 98 and 100, and the MASK field 90, of a row (representing a state) within the state table 80. The FSM 50 is also shown to be coupled to receive a data stream portion from the auxiliary frame buffer 48. Both the values from the state table 80 and the data stream portion are fed to a comparator array 300 that includes four comparators 302, 304, 306 and 308. Each of the comparators 302, 304, 306 and 308 compares a value (if indicated to be valid in the VALID field 90) from the state table 80 to the data stream portion as masked by the mask value received from the MASK field 90. Each comparator may specifically perform "greater than", equal to", or "less than" operations with respect to a respective value.

The outputs from each of the comparators 302–308 are fed to a FSM control unit 310, along with the input values from the state table 80. Based on these inputs, and as described above, the FSM control unit 310 determines the next (i.e., forward) state of the state machine, which is then reflected in the state register 70. Further, in response to the determination of the forward state, the FSM central unit 310 initiates the lookup and fetch of a row from the state table 80 for this forward state. Of course, a HALT or FREEZE condition may exist, in which case the FSM 50 will halt or freeze in the forward state.

Figure 7:
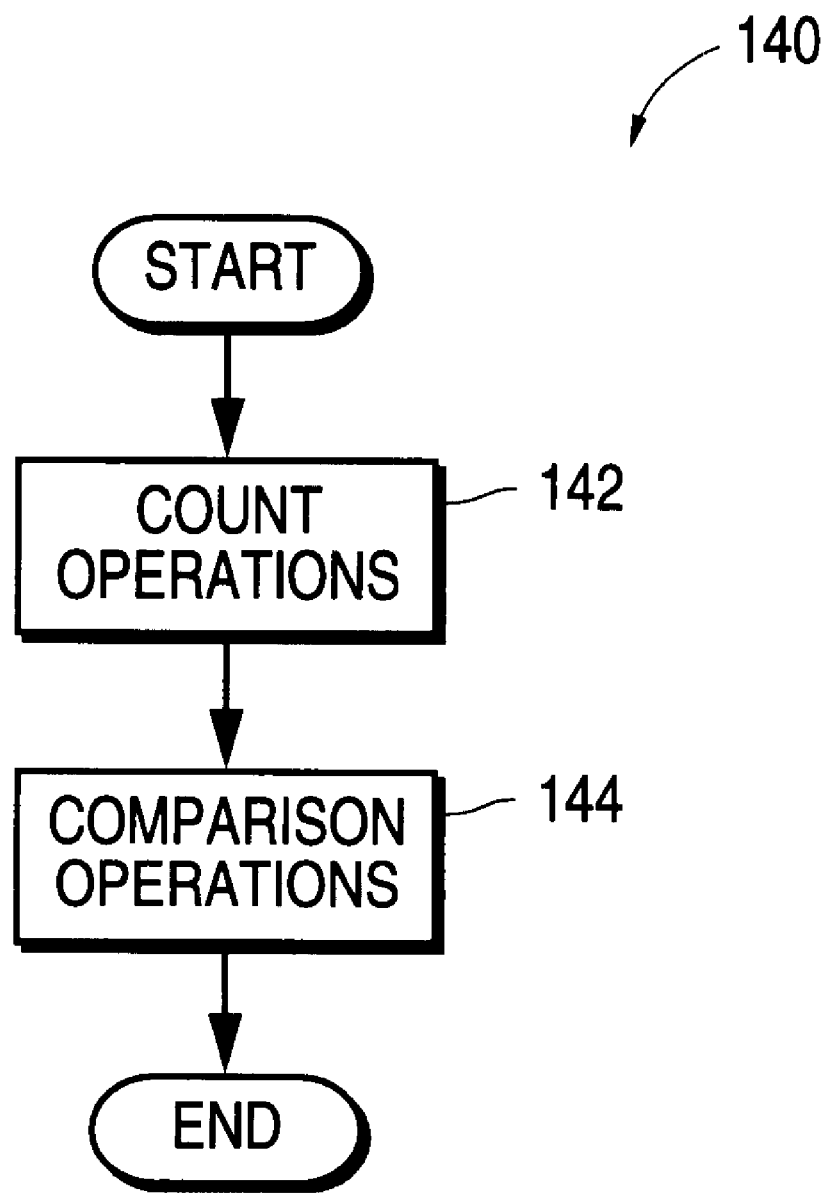
FIG. 7 is a flow chart illustrating broad operation categories that may be performed by the Finite State Machine.

FIG. 7 is a flowchart illustrating a method 140, according to one exemplary embodiment of the present invention, of operation of the FSM 50 in conjunction with a state table 80, such as that as illustrated in FIG. 5. The FSM 50 is hardwired to perform count operations, indicated at 142, and comparison operations, indicated at 144. Broadly, the count operations 142 are performed with a view to determining when a default transition is to occur, and the comparison operations are performed by comparing a comparison value to a masked portion of the data stream to determine a forward state, as specified within the state table 80. Within each comparison operation, the state may change based on an exact match, or less-than or greater-than operations.

The FSM 50 is hardwired to perform the count operations 142 and the comparison operations 144, these operations accessing and reading the state table 80 to determine the parameters of these operations.

Figure 8:
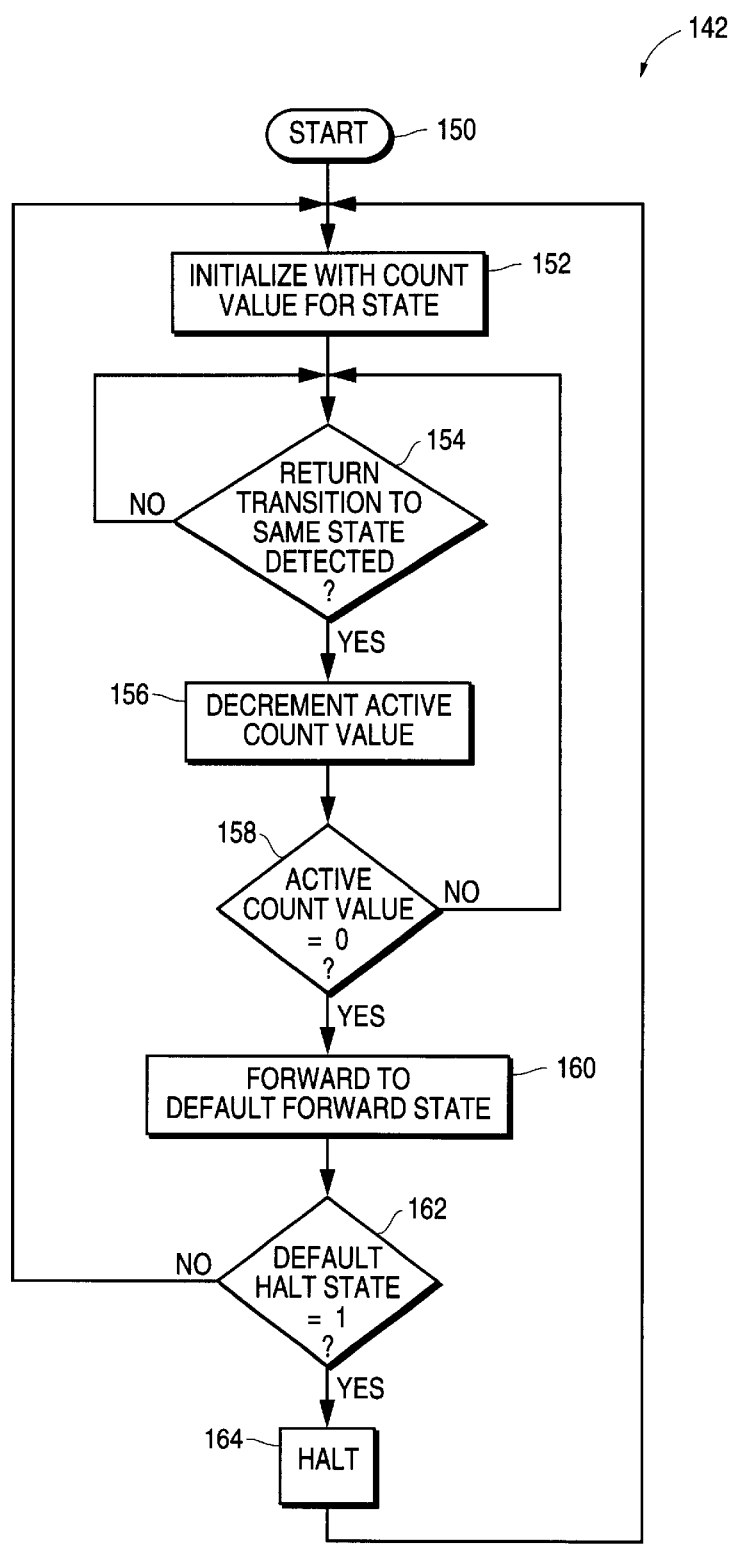
FIG. 8 is a flow chart illustrating the steps performed by the Finite State Machine when performing an exemplary embodiment of count operations illustrated in FIG. 7.

FIG. 8 is a flow chart illustrating the steps comprising a count operation 142, according to one exemplary embodiment of the invention. The count operation 142 commences at step 150, and proceeds to step 152 wherein the FSM 50 is initialized with a count value stored in the COUNT field 82 of a relevant row within the state table 80. At decision box 154, a determination is made as to whether a return transition to the same state has been detected. If not, the count operation 142 enters a loop until such a transition is detected. If a return transition to the same state is detected at decision box 154, an active count value, stored in the ACTIVE COUNT field 84 of the state table 80, is decremented at step 156. At decision box 158, a determination is made as to whether the active count value is equal to zero (0). If not, the count operation 142 loops to decision box 154. On the other hand, if the active count value is equal to zero (0), the FSM 50 transitions to a default forward state, as specified in the DEFAULT FORWARD STATE field 86 within the state table 80, at step 160. At decision box 162, a determination is made as to whether a default halt state variable, stored in the DEFAULT HALT STATE field 88 within the state table 80, is equal to one (1). If not, the count operation 142 returns to step 152. Alternatively, the HALT output 74 is asserted at step 164, before a return is made to the step 152.

Figure 9A:
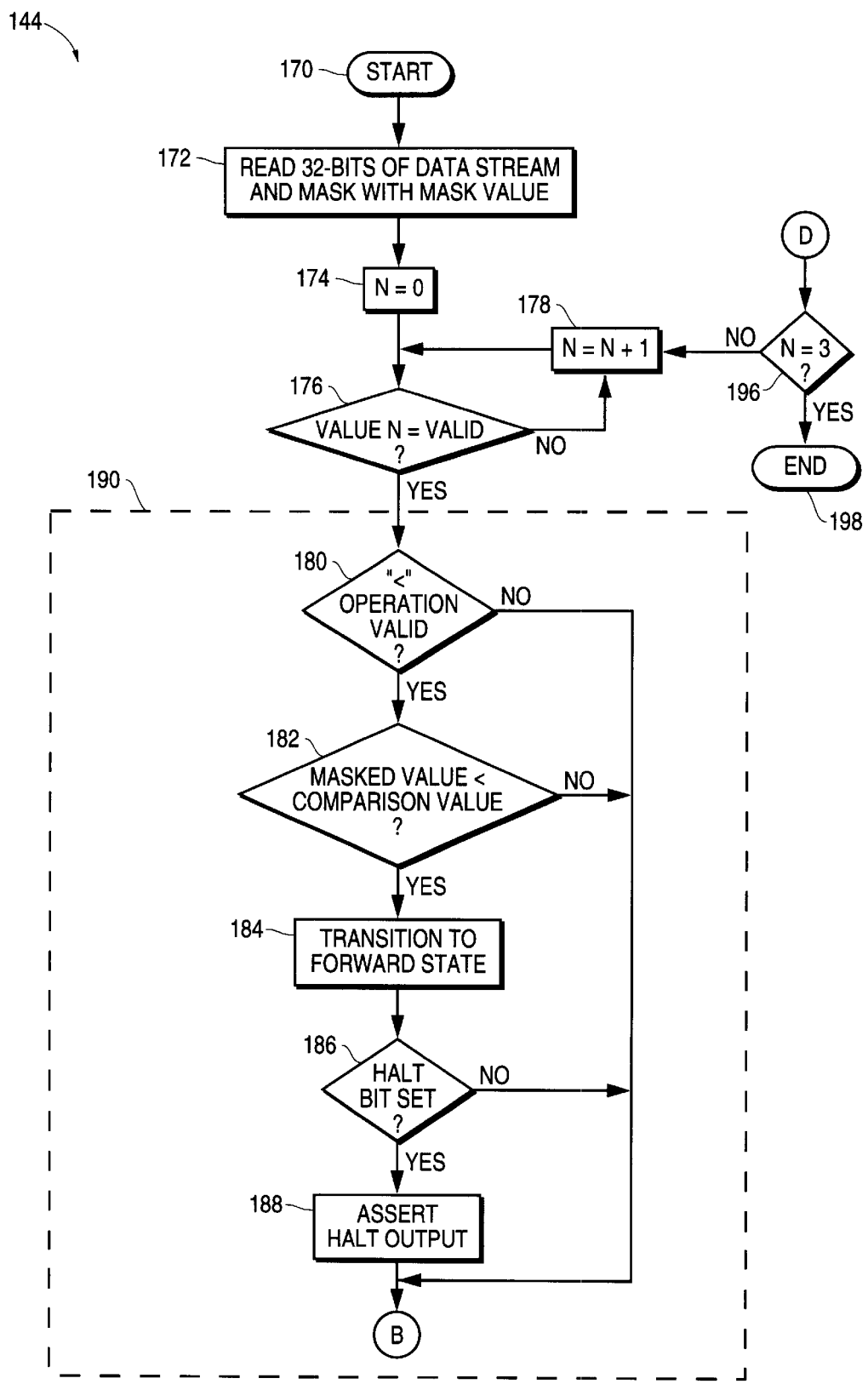
FIGS. 9A–9C show a flow chart illustrating the steps of exemplary comparison operations, according to an exemplary embodiment of the present invention.
Figure 9B:
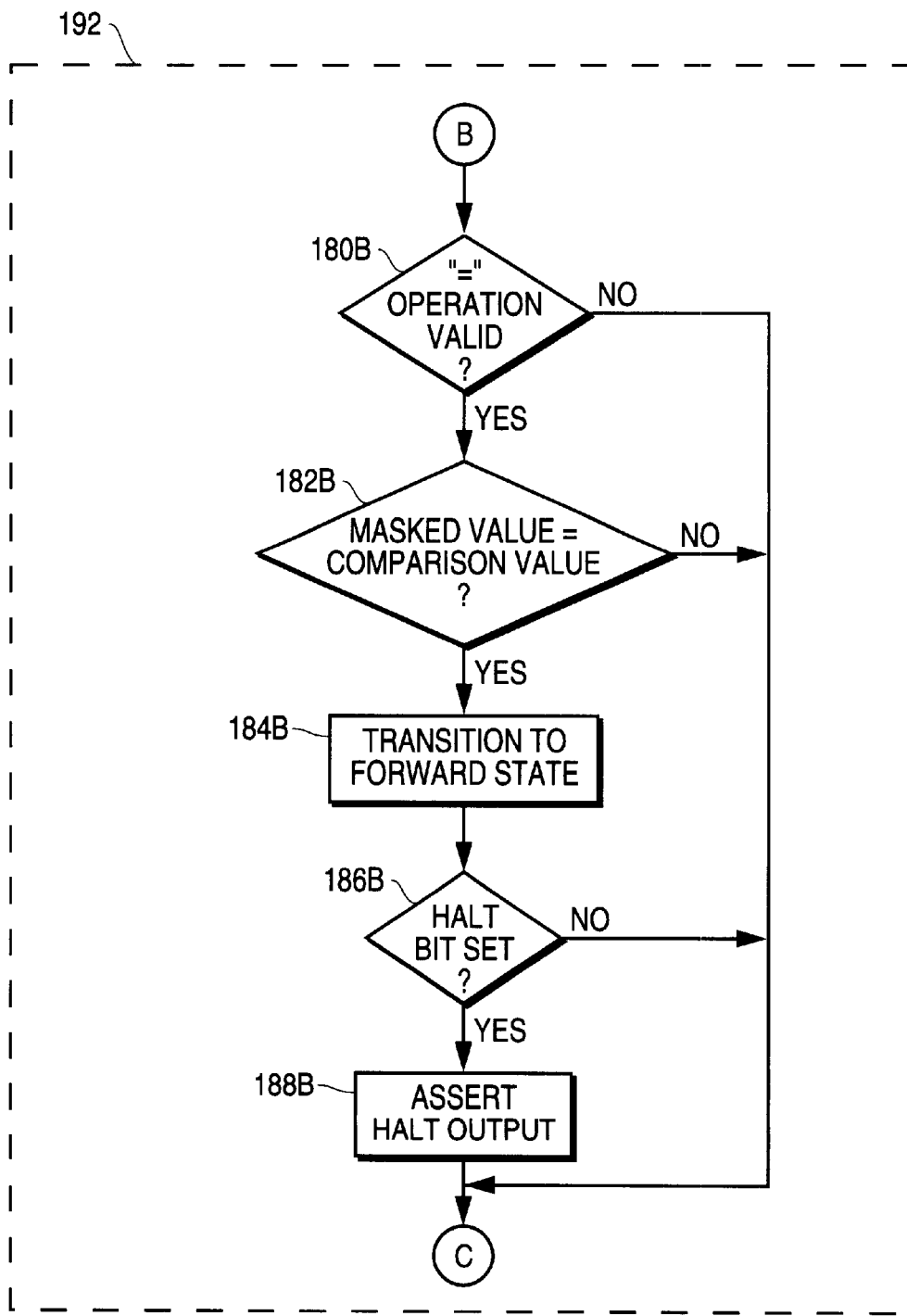
Figure 9C:
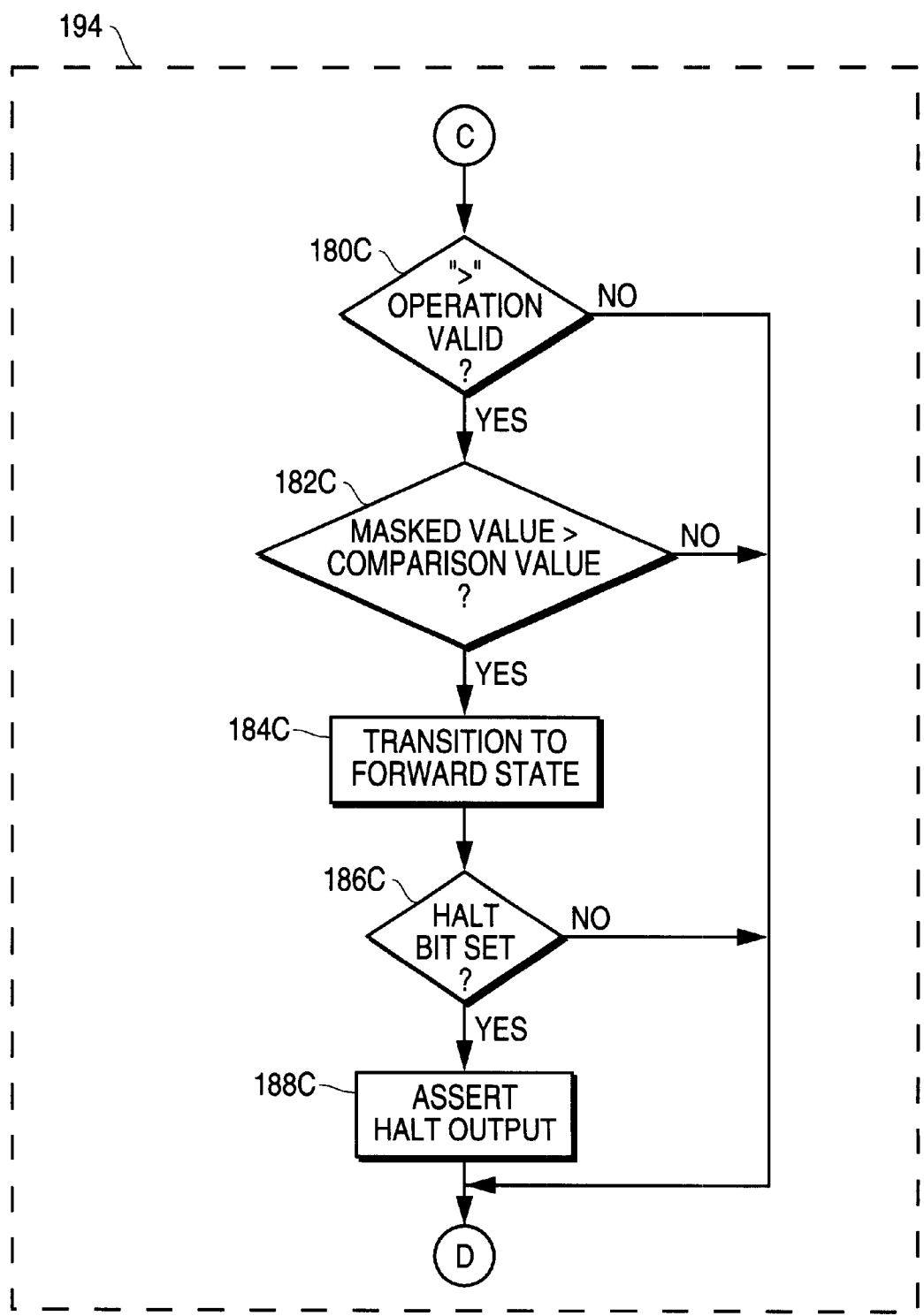

FIGS. 9A–9C show a flow chart illustrating the steps of a comparison operation 144, according to one exemplary embodiment of the present invention. The comparison operation 144 commence at 170 and proceeds to step 172 where 32 bits of data stream (i.e., a 32-bit word), stored within the auxiliary frame buffer 48, are read by the FSM 50. The FSM 50 then retrieves a mask value, stored in the MASK field 80 of the state table 80 stored in the SRAM 52, and masks the data stream portion with this mask value. At step 174, a value count variable is initialized to zero (0). At decision box 176, a determination is made as to whether the Nth value (e.g., a value stored in a VALUE field 94, 96, 98 or 100 of the state table 80) is valid. If not, N is incremented by one (1) at step 178, and the same determination is performed with respect to a further value in the state table.

If the content of a VALUE field 94, 96, 98 or 100 is determined to be valid at decision box 176, the method 144 proceeds to cycle through three comparison operations, namely a "less-than" comparison operation 190, an "equal-to" comparison operation 192 and a "greater-than" comparison operation 194. Each of the comparison operations 190, 192 and 194 commences at step 180 with a determination of whether the relevant operation is valid or not, by examining the contents of the VALID sub-field 114 illustrated in FIG. 5. If not, then operations 190 and 192 proceed to the next comparison operation, and the operation 194 proceeds to decision box 196. If the relevant operation is determined to be valid, a determination is made at decision box 182 whether the masked value within the data stream is less than, equal to or greater than the comparison value, as stored in the VALUE sub-field 104 and as illustrated in FIG. 5. If the results of this comparison operation are negative, the comparison operations 190 and 192 proceed to the next comparison operation, and the comparison operation 194 proceeds to decision box 196. On the other hand, if the result of the determination at decision box 182 is positive, the FSM 50 transitions to a forward state, as specified within the FORWARD STATE sub-field 116 at step 184. At decision box 186, a determination is made as to whether a halt bit, stored in the HALT sub-field 118, is set. If so, the HALT output 74 is asserted at step 188 before the comparison operations 190 and 192 proceed to the following comparison step, or before the comparison operation 194 proceeds to decision box 196.

At decision box 196, a determination is made as to whether N=3, thus indicating that each value within a specific row of the state table 80 has been examined. If not, N is incremented by one (1) at step 178. If N is equal to 3, the comparison operations terminate at 198.

In conclusion, the present invention is particularly advantageous in that it allows packets to be classified quickly by having the states and transitions between the states hardwired, while still providing a degree of programmability.

Figure 10:
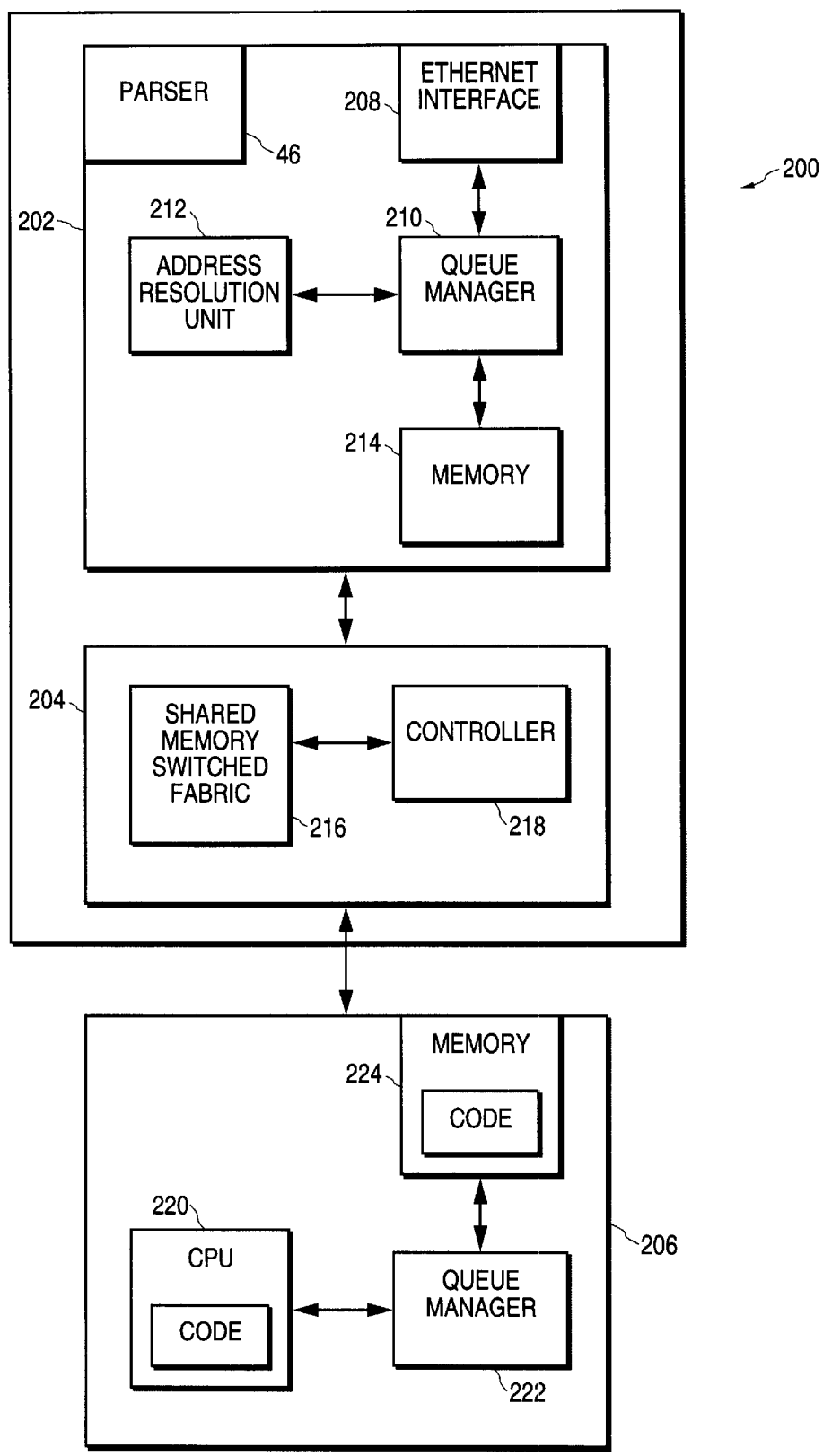
FIG. 10 is a block diagram providing architectural details regarding an exemplary routing switch within which the present invention may be implemented.

FIG. 10 is a block diagram illustrating the architecture of an exemplary routing switch 200, within which the present invention may be implemented. It will however be appreciated that the invention is not limited to use in such a device. The routing switch 200 has three main hardware components, namely one or more input/output (I/O) modules 202, a shared switched fabric module 204 and a Central Processor Unit (CPU) module 206. Each I/O module 202 provides buffering and an interface to a link of the network. Specifically, each I/O module 202 includes an interface 208, a queue manager 210, an Address Resolution Unit (ARU) 212, a memory resource 214 and a parser 46 constructed and operating according to the teachings of the present invention. The ARU 212 maintains a local information base of both routed and bridged traffic, which allows the ARU 212 to resolve addresses and forward packets through the switched fabric independently of a CPU.

The switched fabric module 204 includes a shared memory switched fabric 216, which comprises the core of the routing switch. A controller 218 is associated with the switched fabric 216. The CPU module 206 includes a CPU 220, a queue manager 222 and a memory resource 224, which may comprise a flash memory. Packet forwarding information derived from routing tables is stored within the memory resource 224, and distributed to the ARU units 212 on I/O modules 202.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associate signaling and support systems and services.

Thus, a method and apparatus for classifying a packet within a data stream within a network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. Apparatus for classifying a packet within a data stream in a network, the apparatus comprising:

a state machine defining a predetermined set of states and a predetermined set of transitions between the states which are hardwired within the state machine, and being configured to examine a portion of the data stream, to transition to a forward state based on the examination, and to output a value associated with the forward state and indicative of a classification of the packet; and a programmable memory, coupled to the state machine including a table, to store transition parameters for each of the transitions between the states so as to allow transition conditions to be programmable.

2. The apparatus of claim 1 including a buffer, coupled to the state machine, sized to receive at least one complete packet as defined by a network protocol implemented within the network.

3. The apparatus of claim 1 wherein the transition parameters include a comparison value for comparison to the portion of the data stream.

4. The apparatus of claim 3 wherein the transition parameters include a mask for masking a portion of the data stream not to be compared to the comparison value.

5. The apparatus of claim 3 wherein the transition parameters specify the forward state as a state within the set of states to which the state machine transitions under predetermined conditions.

6. The apparatus of claim 5 wherein the transition parameters include a halt parameter associated with the forward state specifying whether the state machine halts once transitioned to the forward state.

7. The apparatus of claim 5 wherein the transition parameters include a freeze parameter associated with the forward state specifying whether the state machine freezes the data stream before transitioning to the forward state so as to allow the portion of the data stream to be subject to a comparison operation in the forward state.

8. The apparatus of claim 3 wherein the transition parameters specify equal to, less than and greater to comparison operations between the comparison value and the portion of the data stream, and further include a respective forward state associated with each comparison operation.

9. The apparatus of claim 1 wherein the transition parameters include a count value indication of a consecutive number of return transitions to a state of the set of states.

10. The apparatus of claim 1 wherein the transition parameters specify a default forward state, for each state in the set of states, to which the state machine forwards after a predetermined number of returns to a respective state.

11. The apparatus of claim 1 wherein the apparatus comprises a switching system product.

12. The apparatus of claim 1 wherein the apparatus comprises a transmission systems product.

13. A switch for use in a computer network, the switch comprising:

a switching fabric;

a first buffer, coupled to the switching fabric, to buffer a data stream between an input and the switching fabric;

a second buffer, coupled to a hardwired state machine, to buffer the data stream between the input and the hardwired state machine;

the hardwired state machine configured to classify a packet within the data stream, the state machine defining a predetermined set of states and a predetermined set of transitions between the states which are hardwired within the state machine, and being configured to examine a portion of the data stream, to transition to a forward state based on the examination and to output a value associated with the forward state and indicative of the classification of a packet; and a programmable memory, coupled to the hardwired state machine, including a table to store transition parameters for each of the transitions between the states so as to allow transition conditions to be programmable.

14. The switch of claim 13 wherein the state machine performs classification of the packet in parallel with the reception of the packet into the first buffer.

15. A method of constructing a packet classifier for use in a network to classify packets within a data stream, the method comprising:

constructing a state machine defining a predetermined set of states and a predetermined set of transitions between the states which are hardwired within the state machine, and being configured to examine a portion of the data stream, to transition to a forward state based on the examination and to output a value associated with the forward state indicative of the classification of a packet; and programming a memory, coupled to the state machine, by storing as a table transition parameters for each of the transitions between the states.

16. The method of claim 15, wherein the programming of the memory includes placing a comparison value, for comparison to the portion of the data stream, within the transition parameters.

17. The method of claim 16, wherein the programming of the memory includes placing a mask, for masking a portion of the data stream not to be compared to the comparison value, within the transition parameters.

18. The method of claim 16, wherein the programming of the memory further comprises specifying the forward state as being a state within the set of states to which the state machine transitions under predetermined conditions.

19. The method of claim 18, wherein the programming of the memory includes placing within the transition parameters, a halt parameter associated with the forward state and specifying whether the state machine halts once transitioned to the forward state.

20. The method of claim 18, wherein the programming of the memory includes placing a freeze parameter within the transition parameters, the freeze parameter being associated with the forward state and specifying whether the state machine freezes the data stream before transitioning to the forward state so as to allow the portion of the data stream to be subject to a comparison operation in the forward state.

21. The method of claim 18, wherein the programming of the memory further comprises specifying equal to, less than and greater to comparison operations between the comparison value and the portion of the data stream, and including a respective forward state, associated with each comparison operation, within the transition parameters.

22. The method of claim 15, wherein the programming of the memory includes placing within the transition parameters, a count value indication of a consecutive number of return transitions to a state of the set of states.

23. The method of claim 15, wherein the programming of the memory includes placing specifying, within the transition parameters, a default forward state for each state in the set of states to which the state machine forwards after a predetermined number of returns to a respective state.

* * * * *